United States Patent
Reed et al.

(10) Patent No.: US 8,909,891 B2
(45) Date of Patent: Dec. 9, 2014

(54) VIRTUAL LOGICAL VOLUME FOR OVERFLOW STORAGE OF SPECIAL DATA SETS

(75) Inventors: David Charles Reed, Tucson, AZ (US); Max Douglas Smith, Tucson, AZ (US); Kyle Barret Dudgeon, Vail, AZ (US); Esteban Rios, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/188,142

(22) Filed: Jul. 21, 2011

(65) Prior Publication Data

US 2013/0024640 A1 Jan. 24, 2013

(51) Int. Cl.
*G06F 12/08* (2006.01)
*G06F 12/02* (2006.01)
*G06F 12/10* (2006.01)
*G06F 12/00* (2006.01)

(52) U.S. Cl.
CPC ............... *G06F 12/08* (2013.01); *G06F 12/02* (2013.01); *G06F 12/109* (2013.01); *G06F 12/00* (2013.01)
USPC ........... 711/170; 711/173; 711/162; 711/112; 711/114; 711/202

(58) Field of Classification Search
USPC ........................................................ 711/170
See application file for complete search history.

(56) References Cited

U.S. PATENT DOCUMENTS

| | | | |
|---|---|---|---|
| 6,081,879 A | | 6/2000 | Arnott |
| 7,434,017 B2* | | 10/2008 | Maruyama et al. ........... 711/165 |
| 7,584,341 B2 | | 9/2009 | Gal-Oz |
| 2002/0059539 A1* | | 5/2002 | Anderson .......................... 714/6 |
| 2005/0055603 A1* | | 3/2005 | Soran et al. ....................... 714/7 |
| 2005/0108292 A1 | | 5/2005 | Burton et al. |
| 2005/0235132 A1 | | 10/2005 | Karr et al. |
| 2007/0245116 A1* | | 10/2007 | Yamamoto et al. ........... 711/172 |
| 2008/0028143 A1* | | 1/2008 | Murase ........................ 711/114 |
| 2008/0270674 A1* | | 10/2008 | Ginzton ............................ 711/6 |
| 2009/0106492 A1 | | 4/2009 | Muto et al. |
| 2009/0259817 A1 | | 10/2009 | Sharma et al. |
| 2011/0264856 A1* | | 10/2011 | Breda et al. ................... 711/114 |

* cited by examiner

*Primary Examiner* — Yaima Rigol
*Assistant Examiner* — Gautam Sain
(74) *Attorney, Agent, or Firm* — Eric A. Gifford

(57) ABSTRACT

Method embodiments for facilitating overflow storage of special data sets that reside on a single logical volume are provided. A virtual logical volume is created from unallocated memory units across a plurality of logical volumes in a volume group. The virtual logical volume appears the same as any one of the logical volumes in the volume group to an external client. Upon receipt of a special data set that must reside in a single logical volume, an attempt is first made to allocate the special data set to one of the logical volumes in the volume group. If that allocation attempt fails, the special data set is allocated to the virtual logical volume. The virtual logical volume may be created only upon the failure to allocate the special data set to one of the logical volumes, and may be destroyed if sufficient space in one of the logical volumes is freed up to transfer the special data set. Creation of the virtual logical volume may be reserved for only critical special data sets whose failure would result in a storage system outage.

15 Claims, 7 Drawing Sheets

VIRTUAL LOGICAL VOLUME FOR OVERFLOW STORAGE OF SPECIAL DATA SETS

BACKGROUND

1. Field of the Invention

The present invention relates to a method of data storage systems, and particularly related to storage of special data sets that reside on a single logical volume in a volume group.

2. Description of the Related Art

Data handled by storage systems managed by business organizations, local authorities, public offices, financial institutions etc. increases year by year on the one hand, while new storage apparatus (e.g. hard disk drives) are added to or exchanged with existing storage apparatus in accompaniment with increase in the amount of data. When a plurality of storage apparatus are added to a storage system in accompaniment with an increase in the amount of data to be managed, configuration of the storage system becomes complex. Virtualization of a storage system is well known as technology for resolving this kind of problem. Virtualization of the storage system is technology where a plurality of storage apparatus mutually connected to a network are virtualized logically as a single storage system. By virtualizing the storage system, operations management can also be handled jointly as one, and this may contribute towards a reduction in management costs.

To virtualize a single storage system, logical volumes are created that typically reside on one or more of the physical storage apparatus. A volume group specifies a set of multiple logical volumes.

Space is allocated in the volume group from among the logical volumes to accommodate new data sets. Most data sets can spread across the logical volumes. However, certain special data sets must reside on a single logical volume within the volume group. Thus, when a data set of this type is allocated to a volume group that allocation may fail because no single logical volume has sufficient space for the special data set even though the volume group has sufficient storage capacity. Certain kinds of these special data sets are critical to the operation of the storage system. A failure to allocate such critical special data sets can result in storage system outages.

BRIEF SUMMARY

To achieve greater storage performance and reliability for customers, a variety of improvements to storage environments continue to be made. In particular, an improvement to a storage environment provides overflow storage for critical data sets that reside on a single logical volume.

According to one embodiment of the present invention, a storage system includes a volume group comprised of a plurality of logical volumes that reside on a plurality of physical storage devices each comprising memory units. Each logical volume is assigned a different volume serial number. In a method of data storage, a virtual logical volume is created from unallocated memory units across a plurality of the logical volumes in the volume group and assigned a different volume serial number. The memory units in the virtual logical volume are mapped (e.g. by a hash table) to the memory units in the plurality of volumes that constitute the virtual logical volume represented by the same physical storage. The virtual logical volume has the same appearance as the logical volumes in the volume group to an external client (e.g. a program or data accessing method). For example, the logical volumes and virtual logical volume may each comprise a volume table of contents that is a data structure that locates data sets on the logical volume and a volume data structure that contains attributes of the data sets on the logical volume. Upon receipt of a special data set that must reside in a single logical volume, an attempt is first made to allocate the special data set to one of the logical volumes in the volume group that allocation attempt fails, the special data set is allocated to the virtual logical volume.

In certain embodiments, the virtual logical volume is only created if and when an attempted allocation of a special data set to a single logical volume in the volume group fails.

In certain embodiments, the special data sets are flagged as critical and non-critical, and the allocation of a special data set to the virtual logical volume is only performed for critical data sets.

In certain embodiments, if sufficient space is freed up in the logical volumes in the volume group, the special data set is transferred from the virtual logical volume to a single logical volume and the virtual logical volume is destroyed.

In certain embodiments, the virtual logical volume is created by allocating memory units for a plurality of the logical volumes in the volume group having the fewest unallocated memory units. The logical volume(s) having the most unallocated memory units are not allocated to the virtual logical volume.

Related system embodiments are also disclosed and provide additional advantages.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

In the foregoing, various method embodiments for facilitating overflow storage of special data sets that reside on a single logical volume are provided. A virtual logical volume is created from unallocated memory units across a plurality of logical volumes in a volume group. The virtual logical volume appears the same as any one of the logical volumes in the volume group to an external client. Upon receipt of a special data set that must reside in a single logical volume, an attempt is first made to allocate the special data set to one of the logical volumes in the volume group. If that allocation attempt fails, the special data set is allocated to the virtual logical volume. The virtual logical volume may be created only upon the failure to allocate the special data set to one of the logical volumes, and may be destroyed if sufficient space in one of the logical volumes is freed up to transfer the special data set. Creation of the virtual logical volume may be reserved for only critical special data sets whose failure would result in a storage system outage.

Without loss of generality, the various methods and systems for facilitating overflow storage of special data sets that reside on a single logical volume will be described in the context of a storage hierarchy of a particular IBM mainframe storage system known as a "z/OS" volume. It will be understood to those of ordinary skill in the art that the methods and systems are applicable to other virtualized storage systems in which a volume group is comprised of multiple logical volumes that reside on a plurality of physical storage devices each comprising memory units. Alternately, the storage system may be a network attached storage known as a "NAS box".

Figure 1:
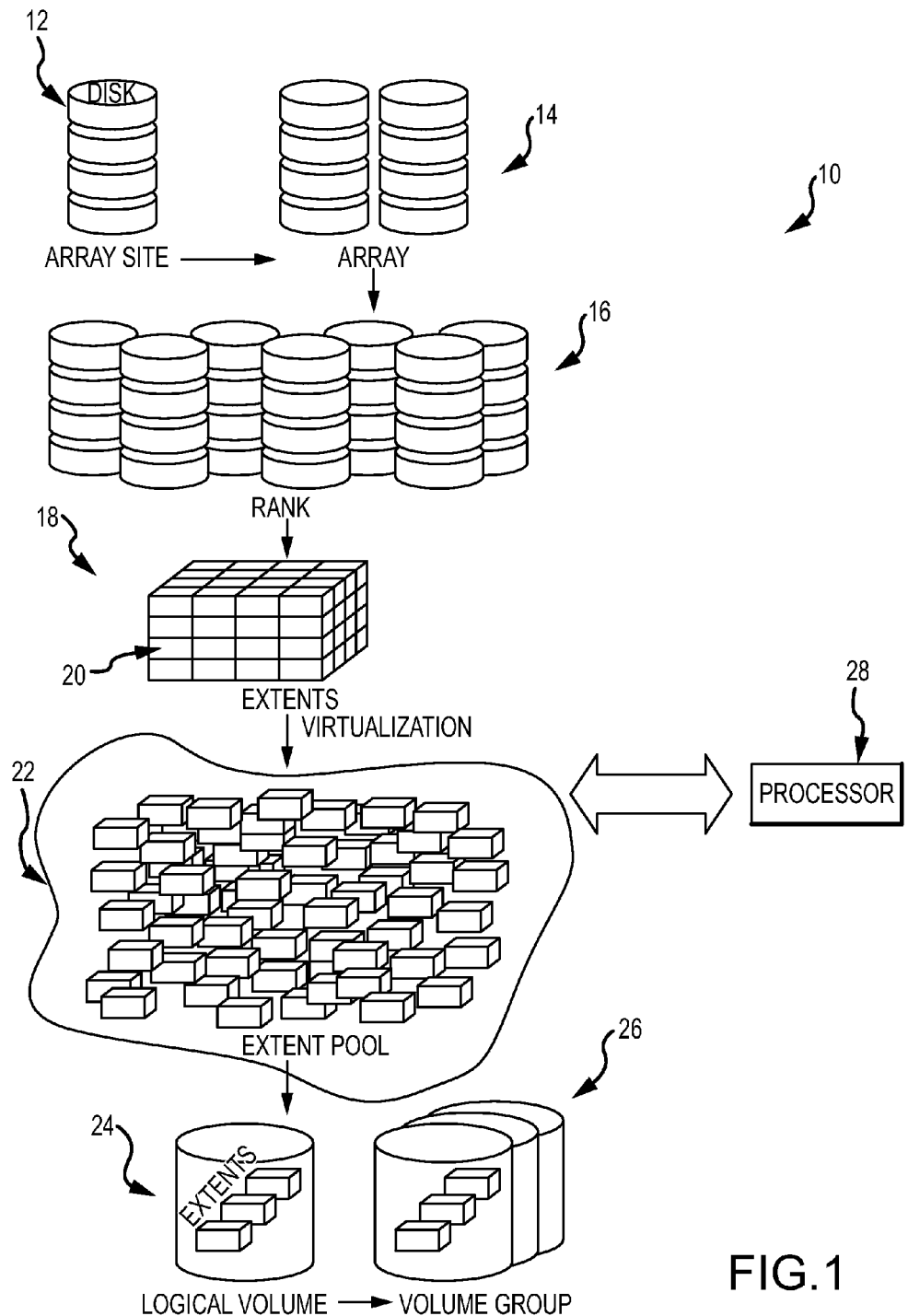
FIG. 1 is a block diagram of an embodiment of an enterprise storage system.

With reference now to FIG. 1, an embodiment of a storage hierarchy 10 for an IBM mainframe storage system begins with a physical storage device 12 such as a physical disk. Logical groupings of, for example, eight physical disks form an array site 14. Logical groupings of one array site 14 form an array 16. A complete description of the storage hierarchy is provided in the IBM System Storage Solutions Handbook, May 2011, which is hereby incorporated by reference.

A rank 18 is defined by the user. The user selects an array and defines the storage format as count-key-data (CKD) or fixed block (FB). In one embodiment, each storage device is a Redundant Array of Independent Disks (RAID) Array, which may be referred to as the "rank". RAIDs have multiple types e.g. 1, 5, 6 10 and different disk RPM speeds e.g. 7k, 10k, 15k and SDD.

Once the ranks are created, the physical storage is considered virtualized. Virtualization dissociates the physical storage configuration from the logical configuration so that volume sizes are no longer constrained by the physical size of the arrays.

The available space on each rank is divided into a number of fixed-size extents 20. In an open-systems host, an extent is suitably 1 Gb. In an IBM System z environment, an extent is the size of an IBM 3390 Mod 1 disk drive. The extents are the building blocks ("memory units") of the logical volumes. An extent is striped across all disks of an array. In certain commonly used terminology, a cylinder represents a division of data on a disk drive; concentric, hollow, cylindrical slices through the physical disks. Each cylinder includes multiple tracks e.g. 1 cylinder=15 tracks. A CC HH identifies the cylinder number, track number and position on the track. Each extent has a starting CC HH and an ending CC HH.

Extents 20 of the same storage type are grouped together to form an extent pool 22. An extent pool is a logical construct that is used to manage a set of extents of the same type that are associated with a given rank group.

When an extent pool 22 is defined, it is assigned a rank group an extent type. One or more ranks with the same extent type can be assigned to an extent pool, but a rank can be assigned to only one extent pool. There can be as many extent pools as there are ranks. There are no constraints on the number or size of ranks assigned to the extent pool. All extents of the ranks assigned to an extent pool are independently available for allocation to logical volumes that are associated with the extent pool.

Typically, all the ranks within an extent pool have the same characteristics relative to RAID type, disk-drive module (DDM) RPM, and DDM interface rate. This allows for a differentiation of logical volumes by assigning them to the appropriate extent pool for the desired characteristics. Different extent sizes for the same device type (for example, count-key-data or fixed block) can be supported on the same storage image, but these different extent types must be in different extent pools.

Multiple extent pools can create storage classes that provide greater flexibility in storage allocation through a combination of RAID types, DDM size, DDM speed, and DDM technology. This allows a differentiation of logical volumes by assigning them to the appropriate extent pool for desired characteristics. Different extent sizes for the same device type (for example, CKD or FB) can be supported on the same storage unit, but these different extent types must be in different extent pools.

A logical volume 24 is comprised of one or more extents 20 from extent pool 22. Each extent is associated with a contiguous range of addressable data units on the logical volume. A logical volume is the storage medium that is associated with a logical disk. The logical volume typically resides on one or more hard disk drives. For the storage unit, the logical volumes are defined at logical configuration time. For CKD servers, the logical volume size is defined by the device emulation mode and model. For FB hosts, the user can define each FB volume (LUN) with a minimize size of a single block (512 bytes) to a maximum size of $2^{32}$ blocks of 2 TB. A logical device that has nonremovable media has one and only one associated logical volume.

Each logical volume 24 is assigned a different volume serial number (a "VOLSER"). Each logical volume comprises a volume table of contents ("VTOC") that is a data structure that locates data sets on the logical volume and a volume data structure ("VVDS") that contains attributes of the data sets on the logical volume. Each logical volume appears the same to an external client such as a program or accessing method.

In an IBM mainframe storage system the VTOC is a data structure that provides a way of locating the data sets that reside on a particular logical volume. The VTOC can reside within the first 64K tracks on the volume, and lists the names of each data set on the volume as well as size, location, and permissions. Additionally, the VTOC contains an entry for every area of contiguous free space on the volume. The third record on the first track of the first cylinder of any volume of DASD (i.e. disk pack) is known as the volume label and must contain a pointer to the location of the VTOC. A VTOC is added to a disk when it is initialized using the Device Support Facilities utility program, ICKDSF.

In the IBM mainframe storage system the VVDS contains information about the data set and its attributes. VVDS is recognized by the restricted data set name SYS1.VVDS.Vvolser, where volser is the volume serial number of the volume on which the VVDS resides. The VVDS is composed of a minimum of two logical records (1) a VSAM volume control record (VVCR) and (2) a VVDS self-describing volume record. The VVCR contains information for management of DASD space and the BCS names that currently have VSAM or SMS-managed non-VSAM data sets on the volume. VVCR might have a pointer to an overflow VVCR. The VVDS self-describing volume record contains information that describes the VVDS. The remaining logical records in the VVDS are VVRs for VSAM objects or non-VSAM volume records (NVRs) for SMS-managed non-VSAM data sets. The hexadecimal RBA of the record is used as its key or identifier.

A volume group 26 specifies a set of multiple logical volumes 24. By identifying different volume groups for different uses or functions (for example, SCSI target, FICON/ESCON® control unit, remote mirror and copy secondary volumes, FlashCopy targets, and Copy Services), access to the set of logical volumes that are identified by the volume group can be controlled. Volume groups map hosts to volumes.

One or more processors 28 are configured to execute software to interact with storage hierarchy 10 to create the logical volumes 24 and volume group 26, to allocate space in logical volumes 24 for data sets, to perform I/O operations to write the data sets to the allocated space and to read the data sets from the logical volumes and to periodically perform space management operations to transfer inactive data sets to a different storage system (e.g. transfer data sets from disk to tape). The software to perform different data storage operations is provided as sequences of computer program instructions embodied on a physical media such as the disk drive.

An embodiment of a system and method for overflow storage of special data sets that must reside on a single logical volume is illustrated in FIGS. 2 through 7 for the IBM mainframe storage system described in FIG. 1.

Figure 2:
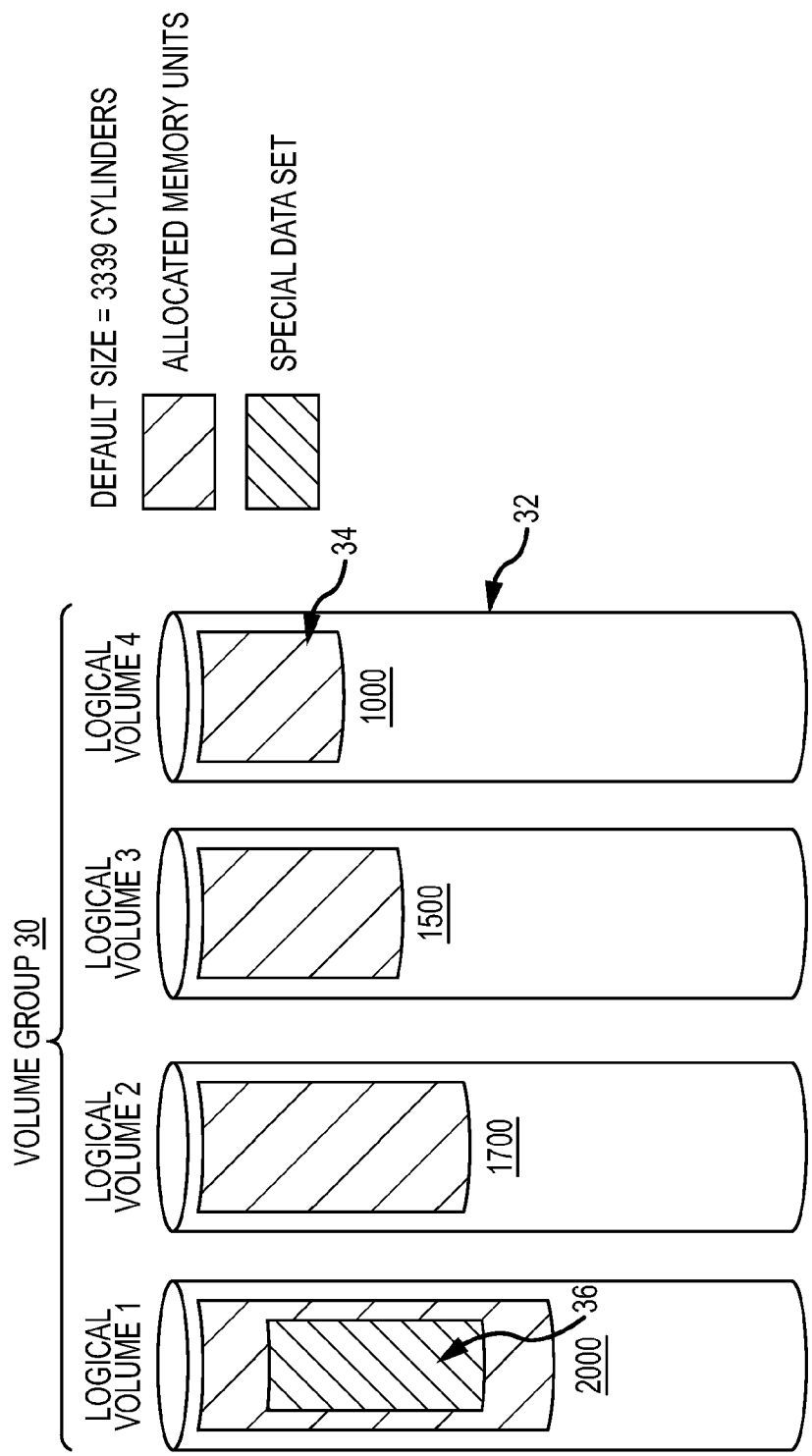
FIG. 2 is a diagram of an embodiment of a volume group comprising multiple logical volumes.

As shown in FIG. 2, a volume group 30 comprises four logical volumes 32. In general, each logical volume may have a different size. In this example, all of the logical volumes have the same default size of 3339 cylinders (e.g. Mod 3 of 1 GB). A cylinder constituting a "memory unit" in this example. In each logical volume, a certain number of memory units 34 have been allocated. Each of the logical volumes is assigned a different volume serial and includes a VTOC and a VVDS.

The memory units may be allocated to regular data sets that can reside on a single logical volume or be spread over multiple logical volumes in the volume group. The external client that uses the regular data set possesses the capability to perform the bookkeeping necessary to interact with a data set spread across the volume group. When a storage request is made, the processor allocates space in one or more of the logical volumes for the regular data set and then writes the regular data set to the allocated space. The external client builds any additional data structures that are required and catalogs the pieces of the data set so that they may be found.

The memory units may be allocated to special data sets that reside on only a single logical volume. The external client that uses the special data set does not posses the capability to perform the bookkeeping necessary to interact with a data set spread across the volume group. Certain external clients existed prior to the capability to spread data sets across multiple logical volumes, hence are constructed based on the assumption that each data set is allocated to a single logical volume. When a storage request for a special data set is made, the processor allocates space on a single logical volume. The external client must simply keep track of the VOLSER and range of memory units. As shown, a special data set 36 of size 1000 has been allocated (and written) to logical volume 1 as part of the 2000 memory units allocated from logical volume 1.

Figure 3:
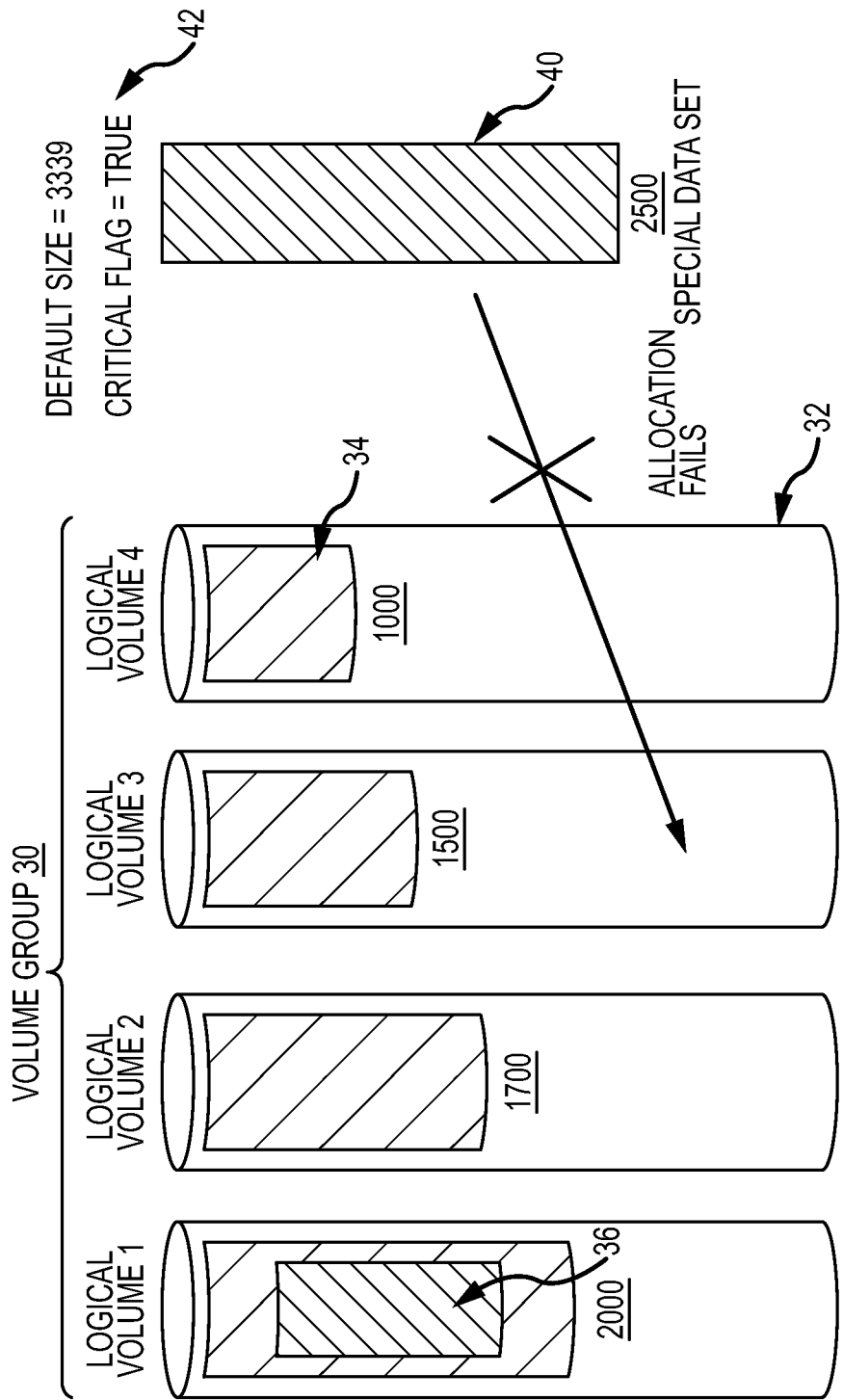
FIG. 3 is a diagram illustrating the failed allocation of a critical data set to a single one of the logical volumes in the volume group.

As shown in FIG. 3, a storage request for a special data set 40 of size 2500 has been made and the allocation failed. None of the individual logical volumes have sufficient unallocated space to accommodate special data set 40. Although the volume group has sufficient space spread over the multiple logical volumes to accommodate special data set 40 because of the requirement imposed by the external client that the data set must reside on a single logical volume the allocation fails.

In many situations, the special data sets may be classified as either "critical" or "non-critical". The special data set may include a flag 42 that can be set to true/false to indicate whether the data set is critical. A critical special data set is one in which a failure to allocate and store the special data set will result in a storage system outage. Although an allocation failure of a special data set to a single logical volume is rare, any outage and downtime of the storage system is to be avoided. Such critical special data sets may include catalogs or non-partitioned data sets. Catalogs or non-partitioned data sets may also be non-critical. Conversely, non-critical special data sets may result in the ability to store a certain piece of user data but will not effect the overall operation of the storage system.

Figure 4:
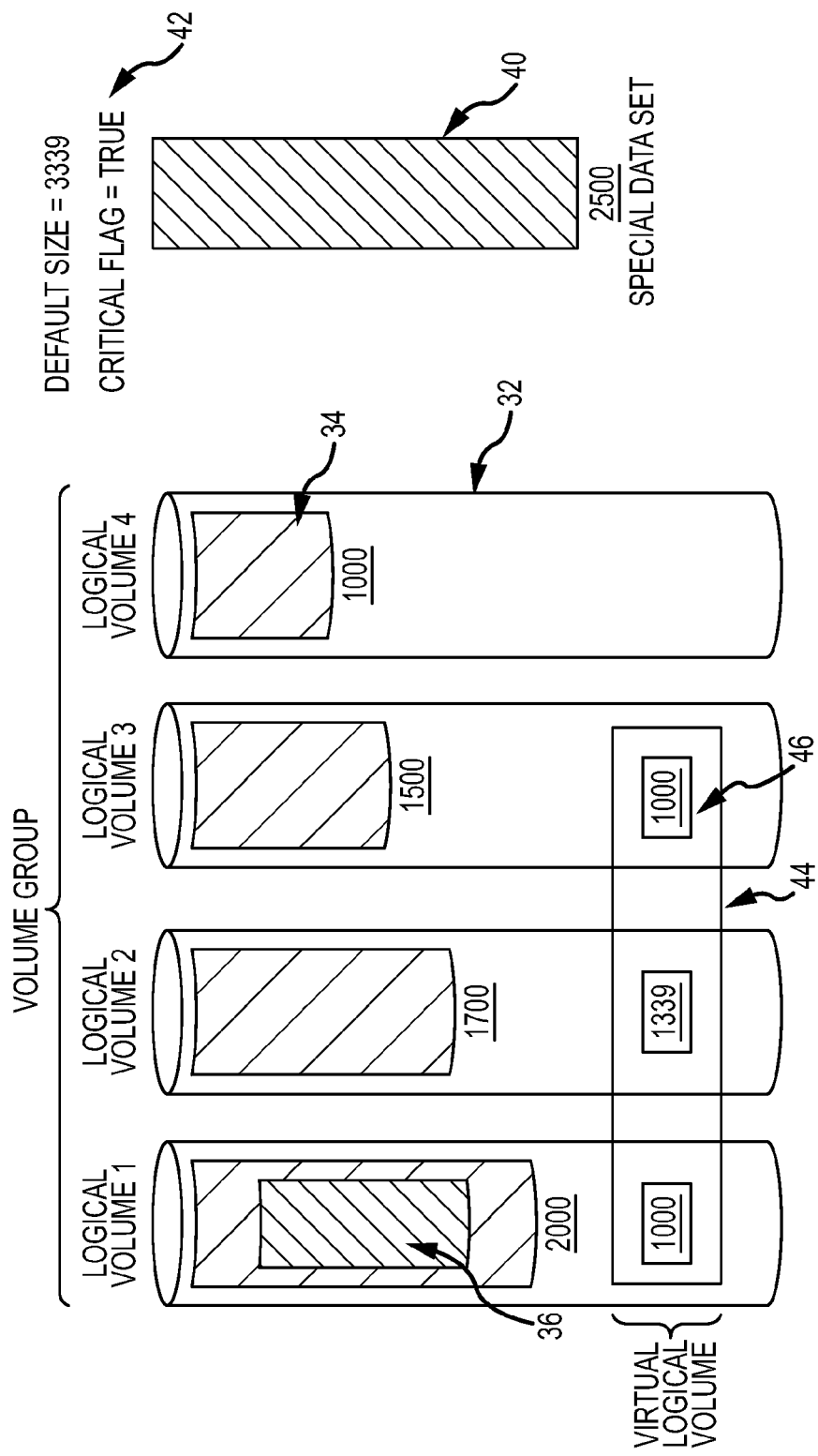
FIG. 4 is a diagram illustrating of a virtual logical volume across the logical volumes in the volume group.

As shown in FIG. 4, if and when the attempt to allocate the special data set 40 to a single one of the logical volumes in the volume group fails and critical flag is true, the processor executes overflow software to create a virtual logical volume 44 of unallocated memory units 46 across a plurality of said logical volumes 32 in the volume group 30. Virtual logical volume 42 is assigned a different volume serial number and includes a VTOC and VVDS. To the external client, virtual logical volume 44 appears to be the same as any one of the logical volumes 32.

In this particular embodiment, virtual logical volume 44 has the same default size as each of the logical volumes 32 in volume group 30. More generally, the processor may size virtual logical volume 44 to have any size that provides sufficient space for the particular critical special data set. In an embodiment, the processor will set the size of the virtual logical volume to be the size of the critical special data set 40 plus an unallocated buffer to allow for growth of the data set. The buffer may be expressed as a percentage (e.g. 10%) of the allocated space.

The memory units that make up the virtual logical volume 44 may be allocated from among the unallocated memory units 46 on a plurality of logical volumes 32 in volume group 30 in any manner that provides the specified size of the virtual logical volume. Memory units 46 will be allocated from at least two and up to all of the logical volumes in the volume group. In order that the volume group, and specifically a single logical volume, may be able service the next allocation request for a critical special data set 40, memory units 46 are suitably first allocated from the logical volume having the fewest unallocated memory units and so forth until the virtual logical volume size is satisfied. At each step, a buffer of unallocated memory units may be preserved to allow for growth of the data sets stored on that logical volume (and not in the virtual logical volume). In this manner, the logical volume (e.g. logical volume 4) having the most unallocated memory units is not used to create the virtual logical volume. If a subsequent allocation request were made for a special data set of size 2000, the processor could allocate space for that data set on logical volume 4.

If a subsequent allocation request is made for a critical special data set that cannot be fulfilled by a single one of the logical volumes in the volume group, the processor may attempt to allocate space in the existing virtual logical volume. If this fails the processor may create a second virtual logical volume.

The virtual logical volume 44 appears to the external client of the critical special data set 40 the same as any of the logical volumes 32 in volume group 30. The virtual logical volume has a volume serial number, a VTOC and VVDS just as the other logical volumes. Therefore, from the perspective of the external client the virtual logical volume satisfies the requirement that the special data set reside on a single logical volume.

The bookkeeping functions that would ordinarily be performed by the external client, which are not supported by the external client for a special data set, are performed by the processor and the overflow software. The memory units in the virtual logical volume are mapped to the memory units in the plurality of logical volumes that constitute the virtual logical volume represented by the same physical storage. The external client sees a volume serial number and sequentially numbered memory units identified by the CC HH information.

Figure 5:
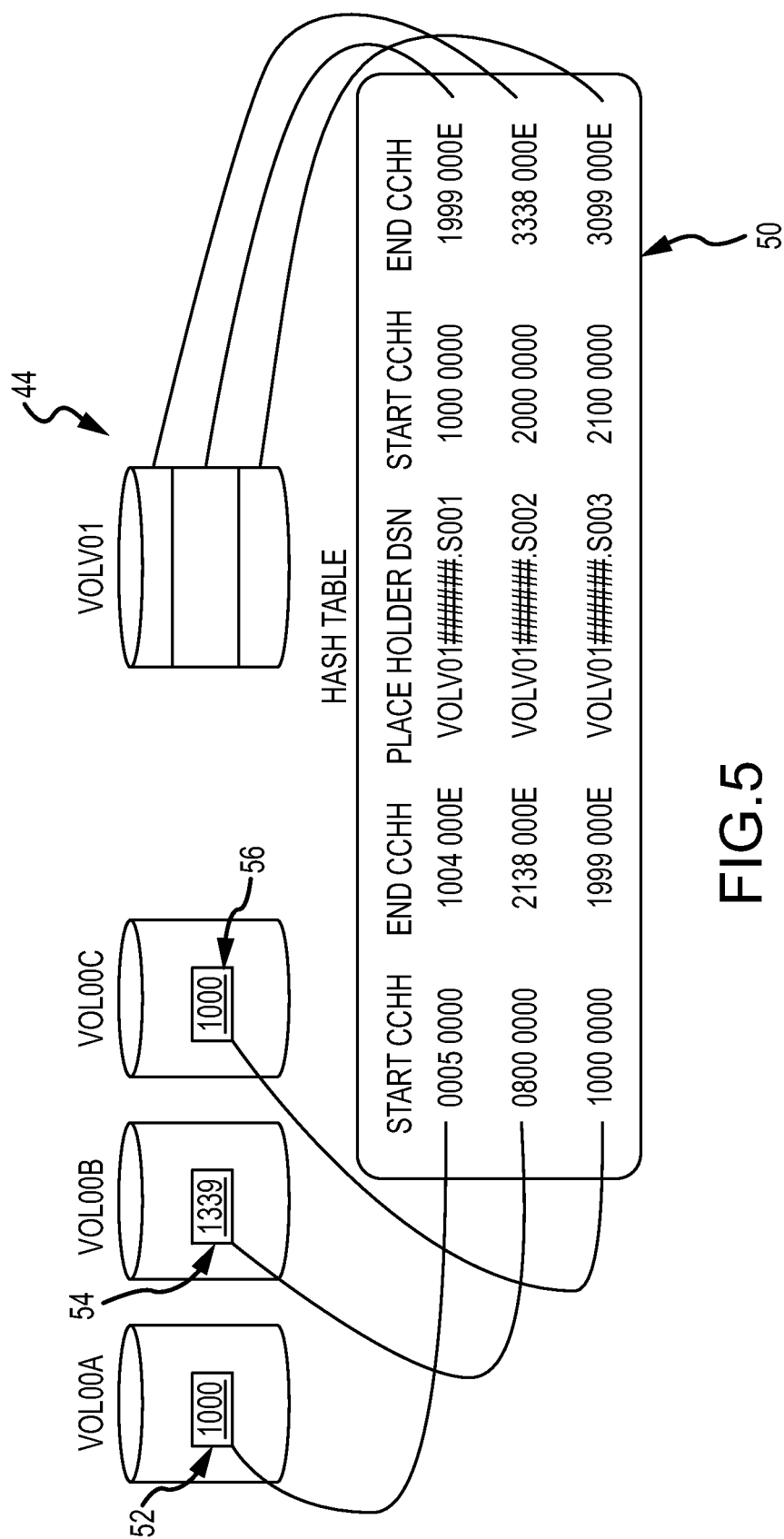
FIG. 5 is a diagram of an embodiment of a hash table mapping the virtual logical volume to its constituent logical volumes.

In an embodiment, as shown in FIG. 5 this mapping is performed by a hash table 50. Hash table 50 is created for a particular virtual logical volume and its assigned volume serial number (VOLSER). In this case the virtual logical volume is "VOLV01". Virtual logical volume 44 is made up of pieces 52, 54 and 54 from logical volumes 1, 2 and 3, respectively. Each piece of the allocation is assigned a placeholder DSN named with the virtual logical volume VOLSER ("VOLV01") as the high level qualifier, an unprintable second qualifier, and a segment number (e.g. S001) that identifies the logical volume 32 from volume group 30. For each segment, the hash table specifies the start CCHH and end CCHH in the virtual logical volume 44 and the start CCHH and end CCHH in the corresponding logical volume 32 for that segment.

In our example, assume the client had VOLV01. A virtual logical volume of 3339 cylinders is allocated across logical volumes 1, 2 and 3 to make it appear that the entire virtual logical volume is empty. 1000 cylinders are allocated on logical volume 1 named VOLV01.######.S001, then 1339 cylinders on volume 2 named VOLV01.######.S002, and finally 1000 cylinders on volume 3 named VOLV01.######.S003. These files can be marked as unmovable by default, so that other users cannot change their location. The other option to allow them to be moved, but that requires a dynamic rebuild of the mapping hash tables. The start and end CCHH on the virtual logical volume for the first 1,000 cylinders are mapped to the start and end CCHH on logical volume 1 for 1,000 cylinders and so forth.

Figure 6:
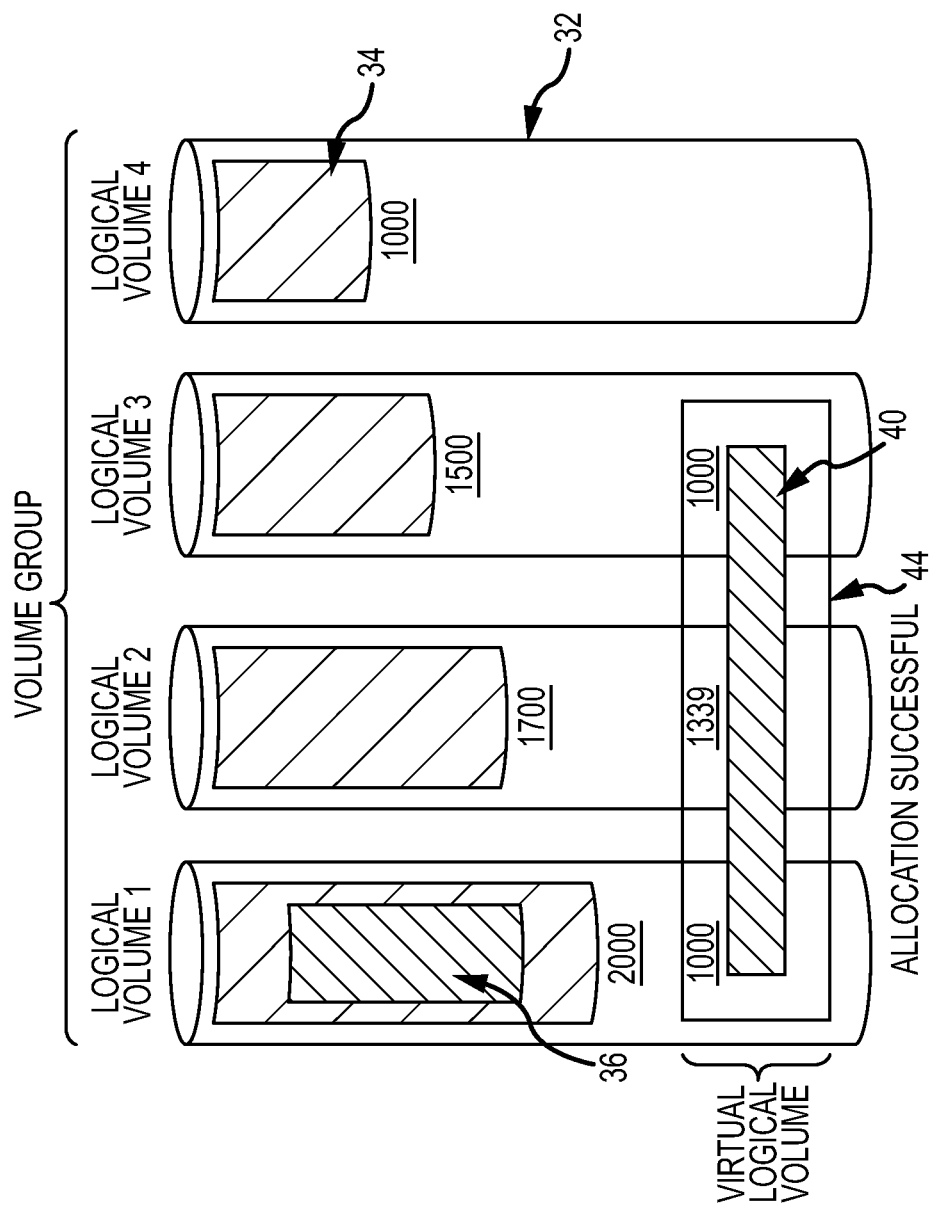
FIG. 6 is a diagram illustrating the successful allocation of the critical data set to the virtual logical volume.

As shown in FIG. 6, critical special data set 40 has been written to virtual logical volume 44. This allocation only immediately uses 2500 of the 3339 cylinders allocated. The remaining space may be reserved as a buffer for growth of the special data set or may be used to possibly accommodate a subsequent allocation request for a critical special data set that cannot be allocated to a single logical volume in the volume group.

If the external client tries to access the virtual logical volume VOLV01 in a specified CCHH range, the processor uses the hash table to identify the logical volume and CCHH range in which the special data set is stored and redirect the I/O request to the correct location on the logical volume in the volume group. A translation service recognizes the UCB setting when the CCW is sent to IOS as being a virtual logical volume. The CCW is then modified and issued to the mapped logical volume location. So, the I/O is actually issued against the logical volume devices address.

The creation of the virtual logical volume to prevent allocation failures for critical special data sets is not without cost. First, the I/O operations to access the special data sets stored in the virtual logical volume require additional overhead. Second, the existence of the virtual logical volume effectively reduces the amount of memory in the volume group that is available for allocation to regular data sets. Therefore, if and when sufficient space becomes available on a single logical volume in the volume group it may be desirable to transfer the critical special data set 40 from virtual logical volume 44 to that single logical volume and destroy the virtual logical volume.

Figure 7:
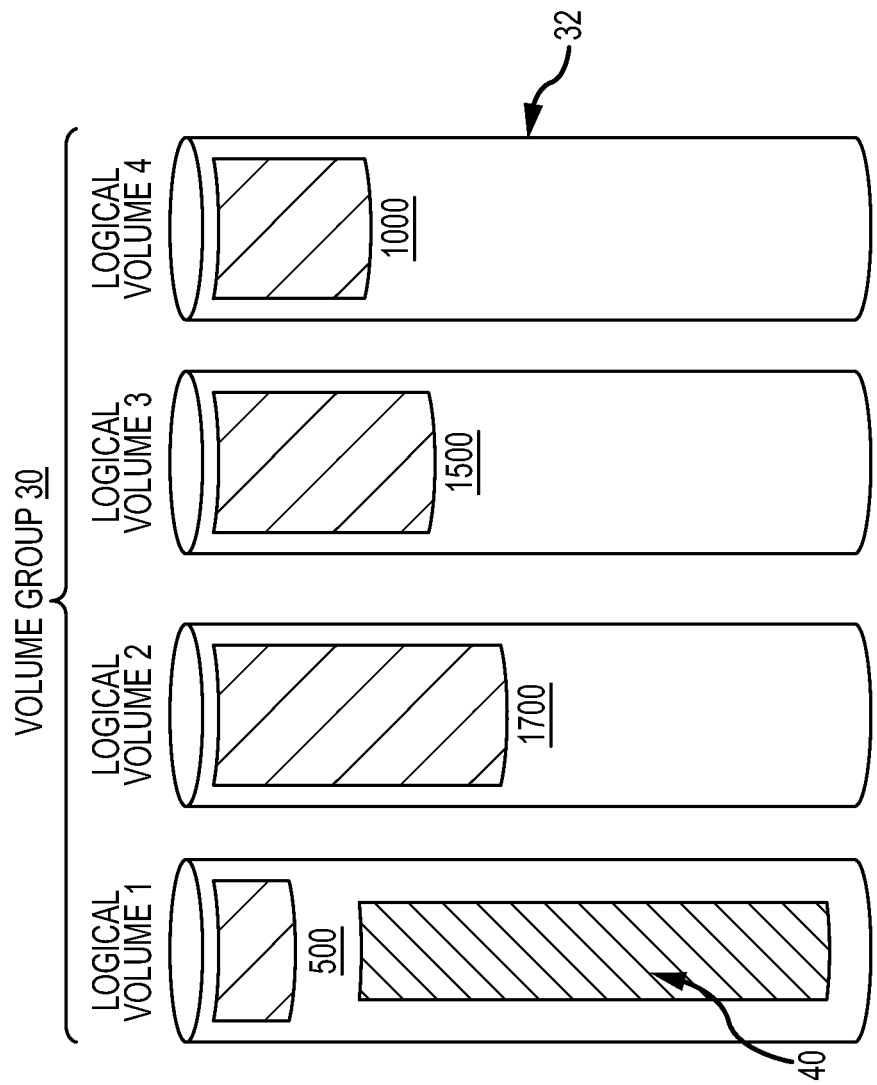
FIG. 7 is a diagram illustrating the transfer of the critical data set to one of the logical volumes as space is available and the destruction of the virtual logical volume.

As illustrated in FIG. 7, periodically the storage system and processor(s) will perform hierarchical storage managements operations during which time inactive data sets are identified and transferred to a different storage system (e.g. transfer from a disk drive system to a tape backup system). In our example, sufficient data has been transferred to the different storage system to free up enough memory to allocate the critical special data set 40 in logical volume 1. Critical special data set 40 is moved from the virtual logical volume to logical volume 1 using a fast replication technique such as Flash-Copy or by a track-by-track copy. Once the replication is complete, the data set 40 is deleted from the virtual logical volume and the virtual logical volume is destroyed.

The methods and systems illustrated in FIGS. 2 through 7 for providing overflow storage for special data sets are but one embodiment of the invention. In an alternate embodiment, the virtual logical volume may be created a priori in case an allocation request for a special data set should fail. In an alternate embodiment, all special data sets may be treated as critical.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a îcircuit,î îmoduleî or îsystem.î Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "Comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.

What is claimed is:

1. A method of data storage, comprising:
providing a plurality of physical storage devices, each device comprising memory units;
allocating the memory units to create a plurality of logical volumes that form a volume group to virtualize a single storage system, each logical volume assigned a different volume serial number;
allocating regular data sets to reside on one or more of the logical volumes in the volume group, a plurality of said logical volumes in the volume group including memory units to which data has not been allocated;
creating a virtual logical volume by reallocating memory units previously allocated across a plurality of said logical volumes in said volume group from only those previously allocated memory units in said volume group to which data has not been allocated to reuse that physical storage device space;
assigning a different volume serial number to said virtual logical volume;
mapping the memory units in the virtual logical volume to the memory units in the plurality of logical volumes that constitute the virtual logical volume represented by the same physical storage so that each of these memory units belongs to both the virtual logical volume and one of the logical volumes from which the logical volume is created and the sizes of the volume group and the storage system remain unchanged by the creation of the virtual logical volume;
reserving the virtual logical volume for only special data sets that must reside in a single logical volume thereby reducing the amount of memory in the volume group that is available for allocation to regular data sets that may reside on one or more logical volumes; and upon receipt of a special data set that must reside in a single logical volume, attempting to allocate the special data set to one of the logical volumes in the volume group, and if the allocation fails allocating the special data set to the virtual logical volume so that said special data set belongs to both the virtual logical volume and to each of the logical volumes from which the virtual logical volume is created.

2. The method of claim 1, wherein each said logical volume in the volume group comprises a volume table of contents that is a data structure that locates data sets on the logical volume and a volume data structure that contains attributes of the data sets on the logical volume, wherein said virtual logical volume comprises a volume table of contents and a volume data structure.

3. The method of claim 1, wherein the virtual logical volume is only created upon the failure to allocate the special data set to one of the logical volumes in the volume group.

4. The method of claim 1, further comprising:
freeing memory units from one or more of the logical volumes in the volume group; and
if sufficient memory exists on one of the logical volumes in the volume group,
allocating the special data set on the virtual logical volume to that logical volume in the volume group, and destroying the virtual logical volume.

5. The method of claim 4, wherein the step of freeing memory units comprises transferring inactive data sets from the logical volumes in the volume group to a different storage system.

6. The method of claim 1, wherein the special data sets that must reside on a single logical volume comprise non-critical and critical special data sets, wherein if the allocation of a non-critical special data set to a single logical volume in the volume group fails the allocation is allowed to fail but if the allocation of a critical special data set to a single logical volume in the volume group fails the critical special data set is allocated to the virtual logical volume.

7. The method of claim 6, wherein the special data sets that must reside on a single logical volume comprise a flag that is set to non-critical or critical.

8. The method of claim 1, wherein the virtual logical volume is created by allocating memory units for a plurality of the logical volumes in the volume group having the fewest memory units to which data has not been allocated.

9. The method of claim 8, wherein the memory units from the logical volume in the virtual group having the most memory units to which data has not been allocated are not allocated to the virtual logical volume.

10. The method of claim 8, wherein each said logical volume in the virtual group has the same number of memory units, said virtual logical volume created to have the same number of memory units as the logical volumes in the virtual group.

11. A method of data storage, comprising:
providing a plurality of physical storage device, each device comprising memory units;
allocating the memory units to create a plurality of logical volumes that form a volume group to virtualize a single storage system, each logical volume assigned a different volume serial number, each said logical volume having the same size;
allocating regular data sets to reside on one or more of the logical volumes in the volume group, a plurality of said logical volumes in the volume group including memory units to which data has not been allocated;
defining special data sets that must reside in a single logical volume, said special data set comprising a flag that is set as non-critical or critical;
upon receipt of a special data set, attempting to allocate the special data set to one of the logical volumes in the volume group, and if the allocation fails and if the flag is set to critical:
creating a virtual logical volume by reallocating memory units previously allocated across a plurality of said logical volumes in said volume group from only those previously allocated memory units in said volume group to which data has not been allocated to reuse that physical storage device space, said virtual logical volume having the same size as the logical volumes, wherein the virtual logical volume is reserved for only special data sets that must reside in a single logical volume thereby reducing the amount of memory in the volume group that is available for allocation to regular data sets that may reside on one or more logical volumes;
assigning a different volume serial number to said virtual logical volume;
mapping the memory units in the virtual logical volume to the memory units in the plurality of logical volumes that constitute the virtual logical volume represented by the same physical storage so that each of these memory units belongs to both the virtual logical volume and one of the logical volumes from which the logical volume is created and the sizes of the volume group and the storage system remain unchanged by the creation of the virtual logical volume; and
allocating the special data set to the virtual logical volume so that said special data set belongs to both the virtual logical volume and to each of the logical volumes from which the virtual logical volume is created;
at a later time, freeing memory units from one or more of the logical volumes in the volume group; and
if sufficient memory exists on one of the logical volumes in the volume group,
allocating the special data set on the virtual logical volume to that logical volume in the volume group, and destroying the virtual logical volume.

12. The method of claim 11, wherein each said logical volume in the volume group comprises a volume table of contents that is a data structure that locates data sets on the logical volume and a volume data structure that contains attributes of the data sets on the logical volume, wherein said virtual logical volume comprises a volume table of contents and a volume data structure, said virtual logical volume and said logical volumes having the same appearance to an external client.

13. The method of claim 11, wherein the step of freeing memory units comprises transferring inactive data sets from the logical volumes in the volume group to a different storage system.

14. The method of claim 11, wherein the virtual logical volume is created by allocating memory units for a plurality of the logical volumes in the volume group having the fewest memory units to which data has not been allocated.

15. The method of claim 1, wherein each said logical volume in said volume group having the same size, said virtual logical volume having the same appearance and the same size as each of the logical volumes in the volume group to an external client.

* * * * *